United States Patent [19]

Cote

[11] Patent Number: 4,776,103

[45] Date of Patent: Oct. 11, 1988

[54] DEVICE FOR AUTOMATIC SIMULTANEOUS CONTROLLING OF THE DISTANCE BETWEEN CATHODES AND THE SECOND GRID OF A TRICHROMATIC CATHODE TUBE GUN

[75] Inventor: Daniel Cote, Ampuis Condrieu, France

[73] Assignee: Videocolor, Montrouge, France

[21] Appl. No.: 944,228

[22] Filed: Dec. 22, 1986

[30] Foreign Application Priority Data

Dec. 23, 1985 [FR] France ................................ 85 19069

[51] Int. Cl.[4] ............................ G01B 5/02; G01B 7/02

[52] U.S. Cl. .......................................... 33/557; 33/558

[58] Field of Search ...................... 33/172 E, 533, 548, 33/552, 557, 559, 560, 561, 572

[56] References Cited

U.S. PATENT DOCUMENTS

| | | | |
|---|---|---|---|
| 3,324,562 | 6/1967 | Kelso | 33/552 |
| 3,670,421 | 6/1972 | Kiewicz et al. | 33/560 |
| 4,221,053 | 9/1980 | Bobel, II et al. | 33/561 |
| 4,292,740 | 10/1981 | Vis et al. | 33/172 E |
| 4,400,884 | 8/1983 | Baresh et al. | 33/552 |
| 4,490,913 | 1/1985 | Vis | 33/172 E |
| 4,616,420 | 10/1986 | Golinelli | 33/561 |

*Primary Examiner*—William D. Martin, Jr.

*Attorney, Agent, or Firm*—Oblon, Fisher, Spivak, McClelland & Maier

[57] ABSTRACT

The control device according to the invention comprises three controlling elements secured to a structure or frame and each comprising a fixed guide, a movable tubular socket and a feeler rod or probe connected to a core of a displacement sensor of which the body is integral with the tubular socket, the tubular socket and the rod being applied by springs against G2 and the cathode respectively.

9 Claims, 3 Drawing Sheets

DEVICE FOR AUTOMATIC SIMULTANEOUS CONTROLLING OF THE DISTANCE BETWEEN CATHODES AND THE SECOND GRID OF A TRICHROMATIC CATHODE TUBE GUN

BACKGROUND OF THE INVENTION

Field of the invention

The present invention relates to a device for simultaneous automatic controlling or checking the distance between cathodes and the second grid of a trichromatic cathode tube gun.

Determination of the distance between the emitting surface of each of the three cathodes and the first grid G1 of a trichromatic cathode tube gun is very important during the manufacture of a cathode tube electron gun in order to ensure, in large-scale manufacture, the constancy of the focussing qualities of the gun grids. The measuring of this distance cannot be directly performed due to the form and the dimensions of the gun.

According to the current state of the art, this distance is indirectly determined by measuring the distance between each cathode and the second grid G2, the access to this second grid being possible through the other grids, the distance between G1 and G2 being estimated. However, the devices normally used for this purpose are bulky, and thus do not allow simultaneous measuring for the three cathodes, and their carrying out in an automated measuring method does not allow to guarantee against any risks of shock on the cathode or the grid G2.

The aim of the present invention is to provide a device allowing the simultaneous automatic checking of the distance of each of the three cathodes to the grid G2, such a device ensuring a very smooth conveyance of the measuring elements in contact with the cathodes and of G2, while performing a very rapid and accurate control.

SUMMARY OF THE INVENTION

The control or checking device according to the invention comprises, secured to a single frame or structure, three, preferably identical, hollow cylinders, disposed according to the axes of the cathodes of a gun, each of these guides containing a coaxial sleeve adapted for of being displaced with the minimum of rubbing in the guide or, a bar feeler rod being displaced with minimum rubbing in the sleeve and being integral with the core of an electronic feeler device or probe the body of which is integral with the sleeve, the rods being retracted by a pneumatic device and brought into measuring position by a spring or a second pneumatic device.

BRIEF DESCRIPTION OF THE DRAWINGS

The present invention will become more apparent from the following detailed description of an embodiment, taken as non-limitative example, and illustrated by the appended drawing in which.

Figure 1:
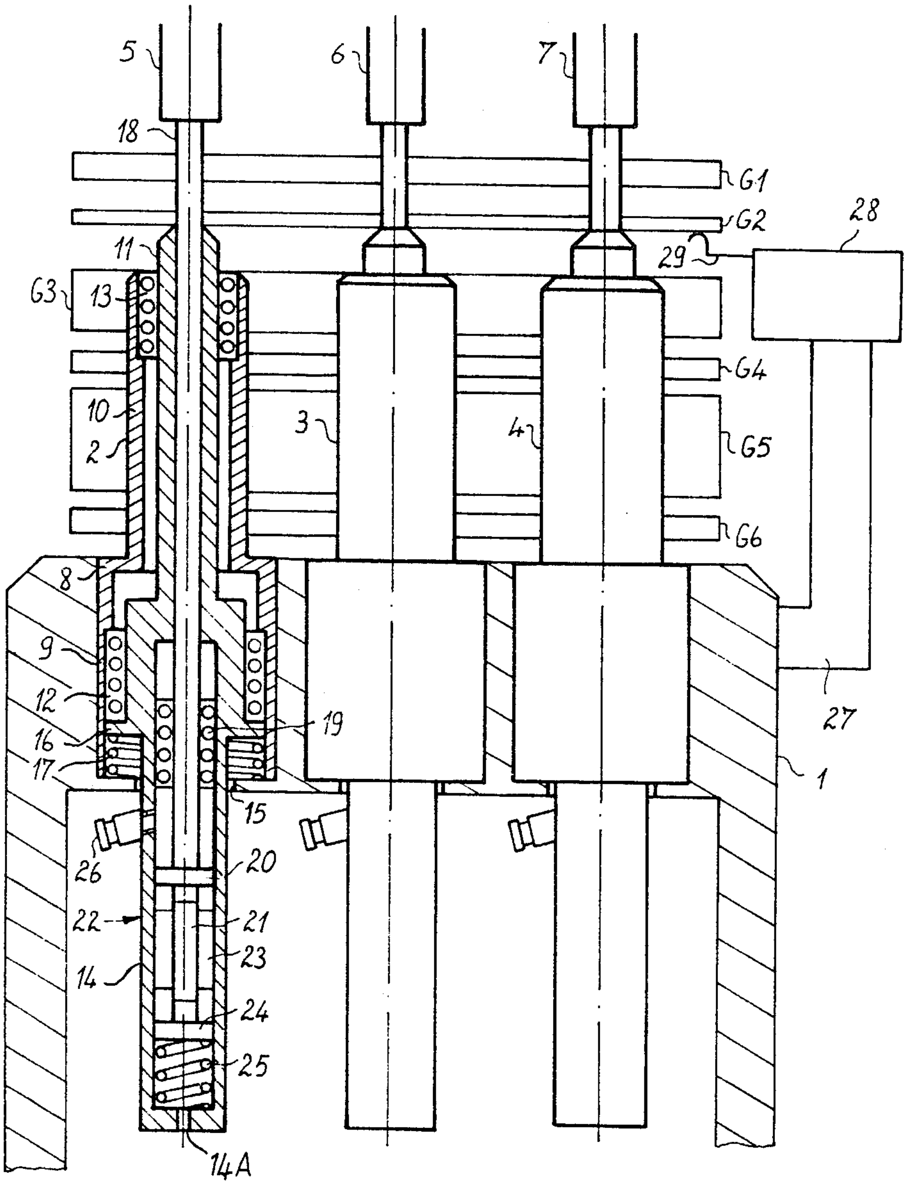
FIG. 1 is a view, partially in cross-section, of a control device according to the invention.

The invention is explained herein-after with reference to a trichromatic tube electronic gun comprising six pre-focusing and focusing grids referenced G1 to G6, but it is well understood that the invention is not limited to such a gun, neither to the said number of grids.

DESCRIPTION OF THE PREFERRED EMBODIMENT

The device of the invention is qualified as control device, since its general purpose is to verify that the distances between the cathodes and the grid G2 of each gun of a series of guns which has just been assembled are comprised within determined limits, the distances outside the limits having the consequence that the guns are scrapped. But this device can also act to measure the individual absolute values of these distances, for example to follow the evolution or the statistical distribution of a manufacturing series.

The device of the invention comprises a frame or structure 1 on which are secured three identical control elements 2, 3 and 4 allowing to perform the cathode G2 distance checkings for cathodes 5, 6, 7 respectively (not represented in detail) of an electron gun, these cathodes producing respectively red, green and blue electronic beams. These three cathodes can possibly be aligned. In the present case, the most usual, these cathodes are aligned, i.e. their longitudinal axes are parallel and coplanar. The part of the device directed towards the cathodes will be called the fore part of the device and that contained in the frame 1 will be called the rear part of the device.

The axes of the elements 2 to 4 are disposed in the same manner as those of cathodes 5 to 7. The distances between the axes of elements 2 to 4 are equal to those of cathodes 5 to 7. The elements 2 to 4 being identical, only element 2 will be described in detail herein-below.

Element 2, having a tubular generally cylindrical form, comprises a hollow cylindrical external guide 8, of which the rear part 9, having a greater diameter than the forepart, is secured in a corresponding deep facing of frame 1. This rear part 9 of the guide 8 bears on the bottom of the facing in which it is secured. The rear part 10 of the element 2, projecting from the frame 1, has an external diameter slightly greater than the diameter of the openings provided in the grids G3 to G6 for the passage of the electronic beam. The length of the part 10 is such that when the frame 1 is in contact with or very close to G6, the free end of this part 10 fits substantially at the same level with G3, on the side of G2.

Inside guide 8, is provided a tubular socket or floating sleeve 11, also having a hollow, circular, generally cylindrical form. This tubular socket 11 is axially displaceable practically without friction inside the guide 8, due to two ball retainers 12, 13 respectively, disposed coaxially in the rear part 9 and in the fore part 10 of the guide 8, between the internal face of the guide and the external face of the tubular socket.

The tubular socket 11 projects from the fore frontal face of the guide 8 by a length greater than the maximal distance possible between the opposite faces of G2 and G3. The tubular socket 11 comprises a rear part 14, also tubular and cylindrical, having a greater internal diameter than the fore part; this part 14 freely crossing through an opening 15 provided in the bottom of the facing in which is secured the rear part 9 of the guide 8. This rear part is present in the form of a cylindrical tube closed at its end, with the exception of a small opening 14A. The tubular socket 11 comprises on its external surface an annular flange 16 of which the external diameter is slightly smaller than the internal diameter of the part 9 of the guide; this flange being located between the ball retainer 12 and the bottom of the facing in which is secured the part 9; in order to allow disposing a helical spring 17 between this flange and the bottom of the facing, this spring urging the tubular socket 11 forwards (towards the cathode 5, the device being in checking position) without however the flange 16 being in abutment against the ball retainer 12 in checking position.

A feeler rod or probe 18 is housed in the sleeve 11. The diameter of this rod is slightly smaller than the internal diameter of the rear part of the tubular socket, so as to be able to slide freely therein. A ball retainer 19, disposed in the rear part of the tubular socket close to the junction with the fore part, allows the rod 18 to be coaxially displaced with a minimum of rubbing or friction against the tubular socket.

The rod 18 comprises close to its rear end, in the vicinity of the middle of part 14, a flange 20 forming a piston in the cylinder formed by the part 14, without however this piston rubbing against the walls of the cylinder. A little beyond the piston 20, the end of the rod 20 is connected at the end to the cylindrical core 21 of a displacement sensor 22, disposed in the axis of the element 2, of which the body 23 is secured inside the cylindrical part 14. The core 21 is connected at its rear end to a short rod 24 terminating by a plate, a spring 25 resting on the one hand, against this plate, and on the other hand, against the closed rear frontal face of the cylindrical part 14, this spring urging forwards the rod 18, core 21 and rod 24 assembly.

A compressed air intake 26 is secured to the wall of the cylindrical part 14 of the tubular socket 11, to the front of the piston 20 (sufficiently forwards for the piston not to extend beyond it in projected position of the rod 18), this intake issuing into the cylinder formed by the cylindrical part 14 and being connected to a compressed air supply (not represented). The pressure exerted by the compressed air issuing from this source must be sufficient to overcome the counter bias of the spring 25 and urge the rod 18 towards the rear, despite the leakages occuring with respect to the piston and at the issue of the fore part of the tubular socket 11; the means of sealing these leakages being prohibited since, as specified herein-above, the rod 18 must be able to be displaced with the minimum of friction inside the sleeve 11.

According to one alternative, not represented, it is possible to replace this pneumatic actuating system by an electro-magnet urging towards the rear the rod 18.

The structure 1 comprises a protruding arm 27, extending parallely to the axes of the elements 2 to 5, forwards, substantially up to the level of the fore frontal faces of the guides of these elements. At the end of the arm 27 is secured an accuracy contactor 28 from which the feeler device or probe 29 extends, substantially perpendicular to the axes of the elements 2 to 4, in the direction of these elements, in a manner so as to contact the grid G2, on the side of G3, when the frame of the control device is in place, i.e. when the elements 2 to 4 have been introduced into the corresponding openings of the grids G6 to G3, the frontal faces of the guides of these elements fitting at the same level with the face of G3 which is opposite G2. The fore frontal faces of the three sleeves are thus resting on the face of G2 which is opposite G3, and the three feeler rods are maintained in retracted or withdrawn position in the corresponding sleeves, from which they do not protrude, under the effect of the pressure exerted by the compressed air on the three pistons (piston 20 and similar pistons of elements 3 and 4) of the feeler rods. Once the feeler device 29 contacts G2, a device (not represented) shuts off the compressed air stream, and the three feeler rods come smoothly under the action of their springs (spring 25 and similar) in contact with the active faces of the cathodes 5 to 7.

Figure 2:
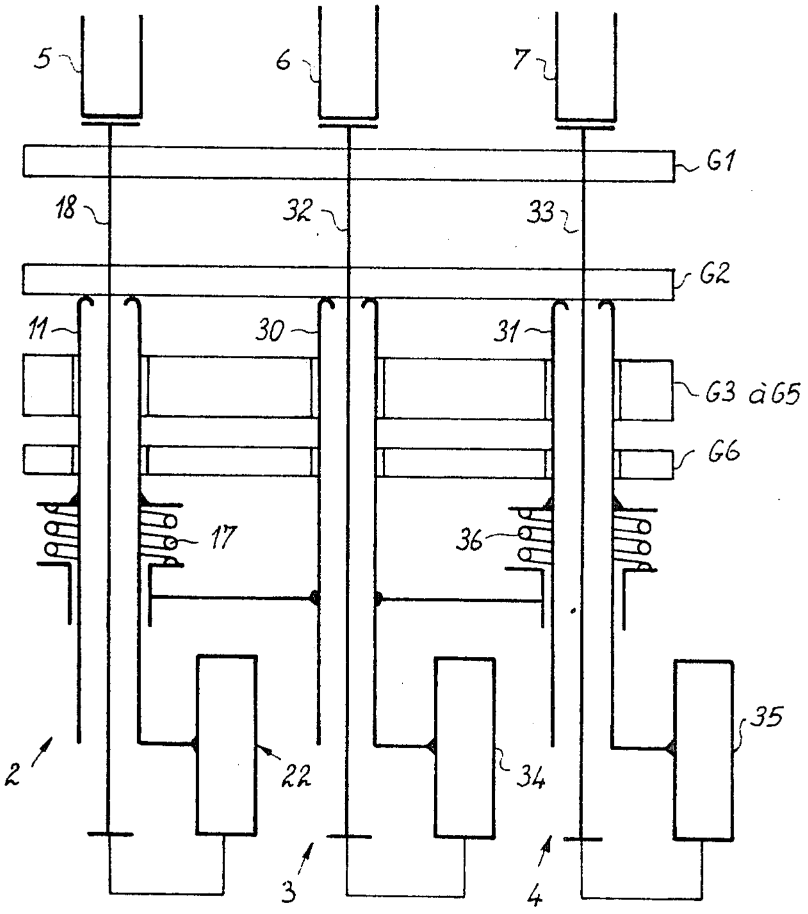
FIG. 2 is a simplified diagram of an alternative of the device of FIG. 1 showing in particular the connections with the electronic feeler devices or probes and FIG. 3 is a cross-sectional view of another embodiment of the device of FIG. 1.

According to one alternative, schematically represented in FIG. 2, the tubular socket of the central element 3 is integral with its guide, i.e. it is fixed with respect to the structure 1, the switch 28 being released when the fore frontal face of the sleeve of this central element contacts G2. It is well understood that for this alternative, the elements allowing the axial mobility of the tublar socket, i.e. the ball retainers and the corresponding springs, are suppressed.

FIG. 2 represents in a simplified manner, apart from the grids and the cathodes of the gun subjected to the checking, the tubular sockets 11, 30 and 31 of the three control elements 2, 3, 4 respectively, their feeler rods or probes 18, 32, 33 respectively and their displacement sensors 23, 34 and 35 respectively, as well as the spring 17 of the tubular socket 11 and the spring 36 of the tubular socket 31, the tubular socket 30 not requiring a spring for this alternative. It is well undertood that this reasoning is applicable if element 3 is identical to elements 2 and 4, provided that it is taken into consideration that the tubular socket of this element is displaceable.

When the checking device is placed in position, the tubular socket 30 comes into contact with G2, the tublar sockets 11 and 31 also being applied, under the action of their respective springs 17 and 36, to G2. These springs allow to apply their tubular sockets while ensuring a good contact even if G2 presents a planeity defect or is not perpendicular to the axes of the control elements 2 to 4.

The bodies of the sensors 22, 34 and 35 being integral with the tubular sockets 11, 30 and 31 respectively, and the feeler rods 18, 32 and 33 being integral with the cores of the sensors 22, 34 and 35 respectively, each sensor supplies the absolute value of the corresponding cathode G2 distance (or, in more simple terms, allows to determine, through an all or nothing response whether this distance is effectively in a determined range or not). These measures or checkings are made simultaneously, when the ends of the feeler rods 18, 32, 33 are correctly contacting the corresponding cathodes. These measures or checkings can be initiated by the closing of the switch 28, after a slight delay time, necessary to allow the feeler rods to protrude from their tubular sockets and contact the cathodes. It is thus simple and reliable to automatize the measurement or checking since the feeler rods only protrude from their sleeves when the control device is correctly in place with respect to the gun.

Figure 3:
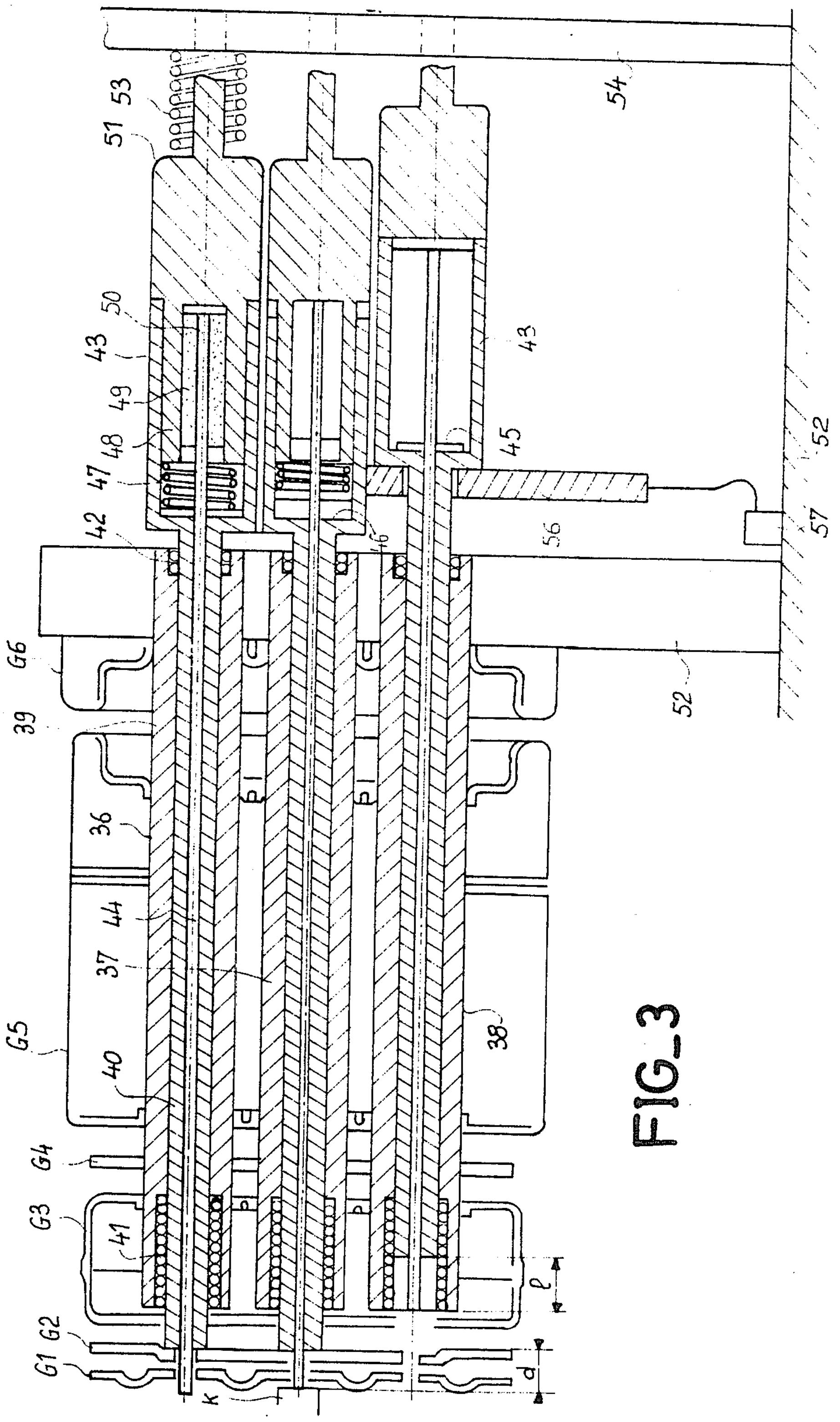

FIG. 3 represents an advantageous alternative of the control device according to the invention; in said alternative, the whole of the measuring sensor, i.e. the feeler rod with its tubular socket, instead of only displacing the rod (rod 18 of FIG. 1), thereby offering supplementary advantages set out herein-below.

The control device represented in FIG. 3 comprises essentially three identical measuring elements 36, 37, 38. Only one of these elements will be described in detail, namely element 36. This element 36 comprises an external sleeve 39 of which the external diameter is smaller than the diameter of the opening of grids G3 to G6. A moveable tubular socket or internal sleeve 40 can be displaced axially practically without friction inside the sleeve 39 due to two ball retainers 41, 42 disposed coaxially inside sleeve 39. The sleeve 40 and at the lower end the lower end (that opposite the grid G1 in measuring position) by a part 43 having larger internal and external diameters than those of its body.

A feeler 44 in the form of a rod is axially displaced by soft friction inside the tublar socket 40. The feeler 44 is substantially the same length as the tubular socket 40 (including its extreme part 43). Onto the feeler 44 is secured a disk 45, being displaced inside the extreme part 43. The position of the disk 45 with respect to the feeler 44 is determined so that when the disk is in abutment against the bottom 46 of the extreme part 43 the feeler extends beyond the fore end of the tubular socket 40 by a length 1 greater by about 1 to 2 mm than the maximal possible value of the distance d between a cathode K and the face of G2 which is located next to G3. A spring 47 is disposed between the disk 45 and a ring 48 secured to the inside of the extreme part 43, this spring bearing upon the face of the disk opposite end 46. The ring 48 extends up to the end of extreme part 43. Inside the ring 48 is secured a displacement sensor device 49 inside the axial hole of which is displaced the rear end 50 of the feeler 44 which acts as core for this sensor. A cover 51 seals the extreme part 43. The structure 52 supporting the three elements of the control device has been represented very schematically on the drawing, in order to be able to represent different positions of this device on a single drawing. Three of these positions are illustrated for each of the elements 36 to 38.

The element 36 illustrates the position of the control device when the three measuring elements have been introduced into the gun and that the fore face of the tubular socket 40 abuts against G2 by being urged through the action of springs such as spring 53 represented for the element 38 (the spring 53 is in the present case a traction spring disposed between one part 54 of the structure 52 and a brace 55 secured around the extreme part 43). The corresponding cathode has not been represented in order to see more clearly the extreme outlet position of the feeler 44. The disk 45 thus rests on the face 46 of tubular extreme part 43. When the feeler 44 rests on the cathode, (cathode K opposite the element 37), this feeler enters very slightly (several tens of millimeters, and a maximum of 1 to 2 mm) into the tubular socket 40, wich results in the disk 45 moving apart by the same value from the face 46. The spring 47 thus urges the feeler against the cathode, as represented for element 37.

When the measuring is completed (see element 38) a "fork" 56, actuated by a jack 57 secured to the structure 52, and disposed around the bodies of the three sleeves 49 of elements 36 to 38, with respect to the junction with the extreme parts 43, simultaneously pushes the cathodes, until, as represented for element 38, the feeler 44 is entirely withdrawn inside the protective sleeve 39. Thereafter, the structure is displaced in order to disengage the three elements of the gun.

The device comprising the feeler 28, 29 and actuating the outlet of the feeler rods in the device represented on FIG. 1 can be adapted to the device of FIG. 3. In this case, it pushes fork 56 and thus provokes the simultaneous displacement of the feelers 44 and of their tubular sockets 40 towards the cathodes once the tubular sockets are in place with respect to the gun (as represented in FIG. 3).

The device described herein-above presents, due to the fact that during the placing in the measurement position and during the withdrawal, the feeler 44 +tubular socket 40 assembly is displaced instead of simply displacing the feeler (as was the case for the embodiments according to FIGS. 1 and 2), the following advantages:

- the short travel of the feeler with respect to the tubular socket allows utilization of an accurate microdisplacement feeler;
- great amplitude displacements do not affect the sensor, thus the elements of this sensor are less subject to wear, and are practically free of jamming risks;
- the measuring system per se (feeler and internal tubular socket +sensor) is easily removable, can be calibrated independently from its support (external sleeve, structure) and is thus interchangeable rapidly and without the need for adjustment.

I claim:

1. A device for simultaneous automatic measuring of the distance between cathodes and the second grid of a trichromatic cathode gun comprising:
   - secured to a common frame, three hollow cylindrical guides, each of said guides containing a coaxial tubular socket for being displaced with the minimum of friction inside the guide and applied against said second grid;
   - a transducer being displaced with the minimum of friction in the tubular socket and integral with the core of an electronic feeler device or probe of which the body is integral with said tubular socket and in contact with said cathodes.

2. A device according to claim 1, wherein the feeler rod and internal tubular socket assembly is retracted by a fork.

3. A device according to claim 1, further comprising:
   - means of retract each rod into its tubular socket by a pneumatic device; and
   - means for projecting each rod in control position, by way of a spring applying it to the corresponding cathode.

4. A device according to claim 1, further comprising:
   - means for retracting each rod into its tubular socket by way of a first pneumatic device and;
   - means for projecting in control position, by way of a second pneumatic device.

5. A device according to claim 1, further comprising:
   - means for retracting each rod into its sleeve by way of an electro-magnet device and means for projecting in control position, by way of a spring applying it to the corresponding cathode.

6. A device according to claim 1, wherein the tubular sockets and the rods are displaced in ball retainers.

7. A device according to claim 1, further comprising:
   - a feeler device for actuating, through contact on a second grid of the gun, when this device is placed in position for the checking, the projection of the feeler rods and the measuring step.

8. A device according to claim 1, wherein the tubular socket is secured, with respect to its guide inside the central control element, the tublar sockets of the two other checking elements being longitudinally movable.

9. Device according to claim 1, wherein the tubular sockets are longitudinally movable inside the three control elements.

* * * * *